United States Patent
Moe

[15] 3,690,687
[45] Sept. 12, 1972

[54] MACHINE TOOL

[72] Inventor: Fred L. Moe, 4380 Brookside Ave., Minneapolis, Minn. 55435

[22] Filed: July 6, 1970

[21] Appl. No.: 52,522

[52] U.S. Cl. .............................279/4, 82/29, 82/30
[51] Int. Cl. ...............................................B23b 5/22
[58] Field of Search ............................279/4; 29/38 B

[56] References Cited

UNITED STATES PATENTS

| | | | |
|---|---|---|---|
| 2,793,040 | 5/1957 | Wilson | 279/4 |
| 2,775,026 | 12/1956 | Schrader | 279/4 X |
| 1,656,624 | 1/1928 | Finsen | 279/4 X |

*Primary Examiner*—Leonidas Vlachos
*Attorney*—James R. Cwayna

[57] ABSTRACT

A machine tool which provides rotative movement to the work piece, including a source of power driving a spindle which spindle includes a collet receiving draw bar with an air driven and controlled piston attached to the piston for automatically shifting the draw bar inwardly into the spindle whereby the collet is closed about the work piece. The entire spindle unit including the draw bar shifting piston is rotatably mounted for rotation within a mounting base.

2 Claims, 9 Drawing Figures

Patented Sept. 12, 1972

INVENTOR.
FRED L. MOE
BY
James R. Cwayna
ATTORNEY

Patented Sept. 12, 1972

INVENTOR.
FRED L. MOE
BY
James R. Cwayna
ATTORNEY

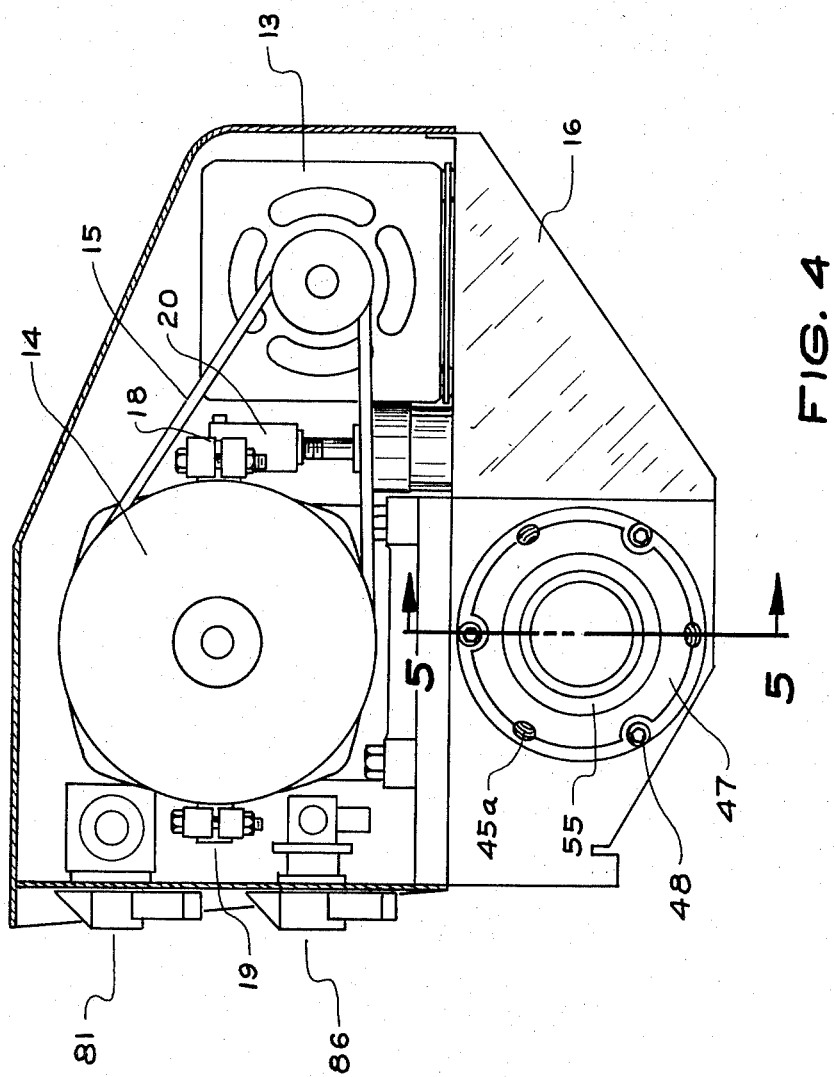

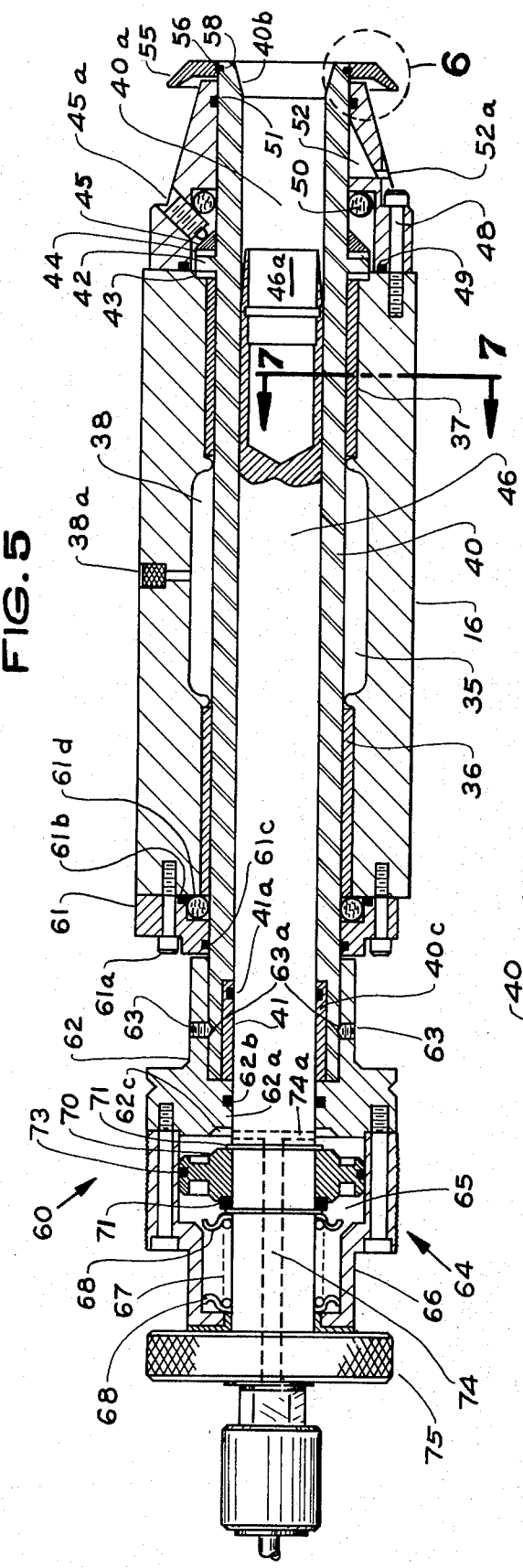
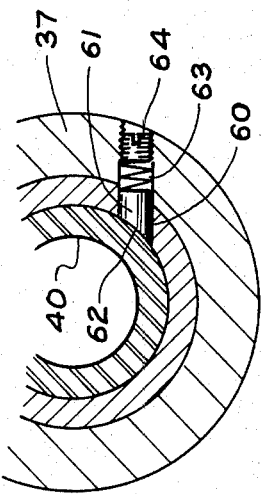
INVENTOR.
FRED L. MOE
BY
James R. Cwayna
ATTORNEY

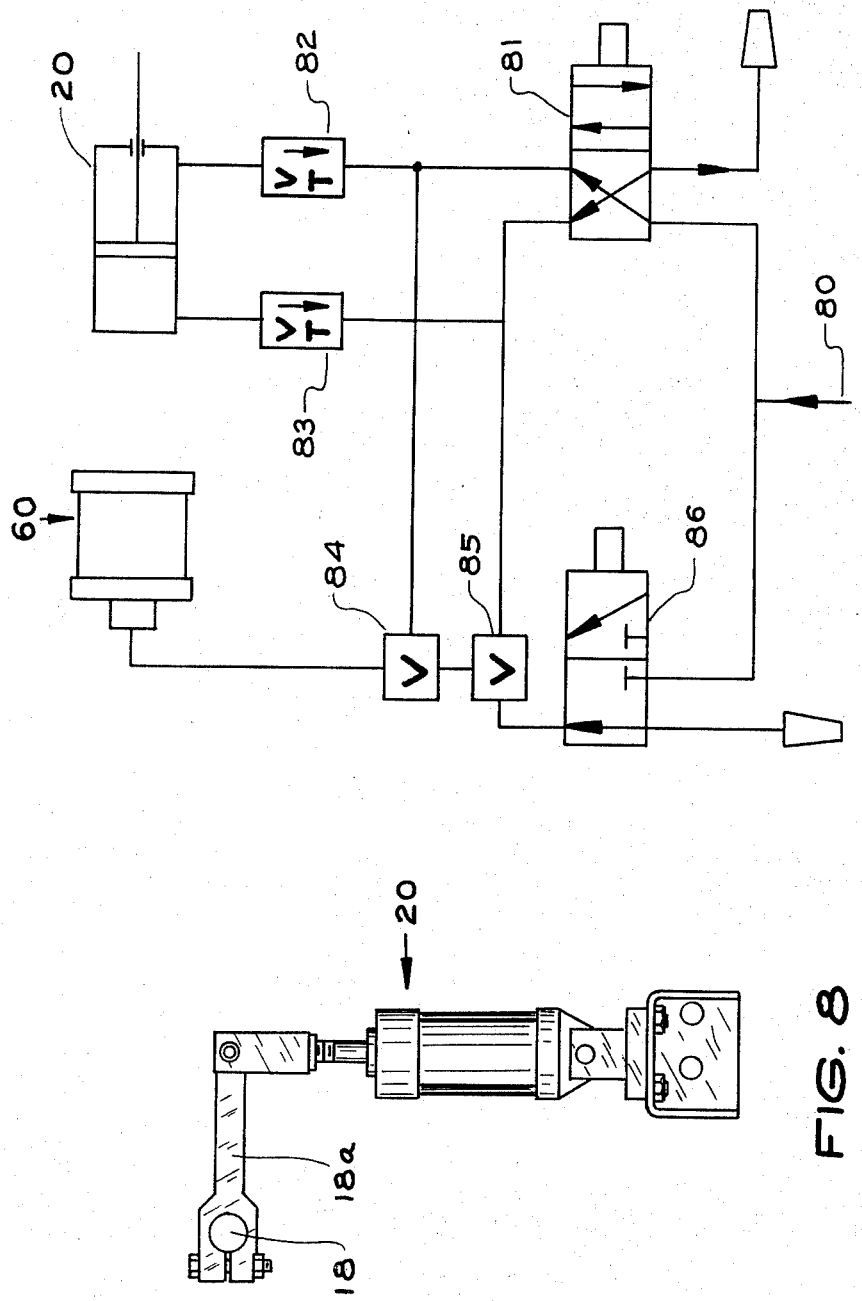

MACHINE TOOL

The machine tool industry is a well established art and includes a variety of different machines for the various machining processes. Applicant has provided herein a new and unique device which may be utilized as an attachment for now available machines or may be used as a work holding piece having its own source of rotary power as a completely individual machine.

The device as provided herein includes a unique chucking feature wherein a collet draw bar is provided for use with standard available collets and air actuated shifting means are employed to shift the draw bar and pull the collet into closing position with an internal tapered collet receiving surface. This air system may provide an automatic work release function when the rotative power to the unit is stopped or may in a second form provide a continuous holding force whether the machine is running or not.

Applicants device further includes speed control features and also includes a unique controllable start up feature wherein the speed of rotation will be achieved at a uniform controllable rate rather than simply reaching the rate through normally accepted build up.

It is therefore an object of applicatn's invention to provide a machine tool having a self contained source of rotative power and having a work holding spindle driven thereby with means to control the speed of the spindle.

It is another object of applicant's invention to provide a work chucking structure which includes a collet receiving draw bar with means for shifting the draw bar to draw the collet against a closing surface.

It is a further object of applicant's invention to provide a chucking structure for a machine tool which includes means for automatically releasing the work piece upon stopping of the rotative motion of the chuck assembly or to selectively continue the chucking force when the rotation of the assembly is stopped.

It is still a further object of applicant's invention to provide a machine tool having a speed build up control whereby the desirable speed is achieved at a relatively constant rate of build up.

It is still a further object of applicant's invention to provide a machine tool in which the entire spindle assembly which includes an automatic chucking system is mounted for rotation within a base support to present a minimal number of relative rotation areas and thereby provide a unit capable of long wear proof and desirable tolerance life.

These and other objects and advantages of the invention will more fully appear from the following description made in connection with the accompanying drawings, wherein like reference characters refer to the same or similar parts throughout the several views and in which:

FIG. 4 is an elevation taken from the right side of the unit;

FIG. 5 is a vertical section taken substantially along line 5—5 of FIG. 4;

FIG. 6 is a partial section taken from the area designated 6 on FIG. 5;

FIG. 7 is a partial section taken substantially along line 7—7 of FIG. 5;

FIG. 8 is a vertical section taken substantially along line 8—8 of FIG. 2 particularly illustrating a control cylinder for the unit; and, FIG. 9 is a schematic of the controls for the unit.

Figure 1:
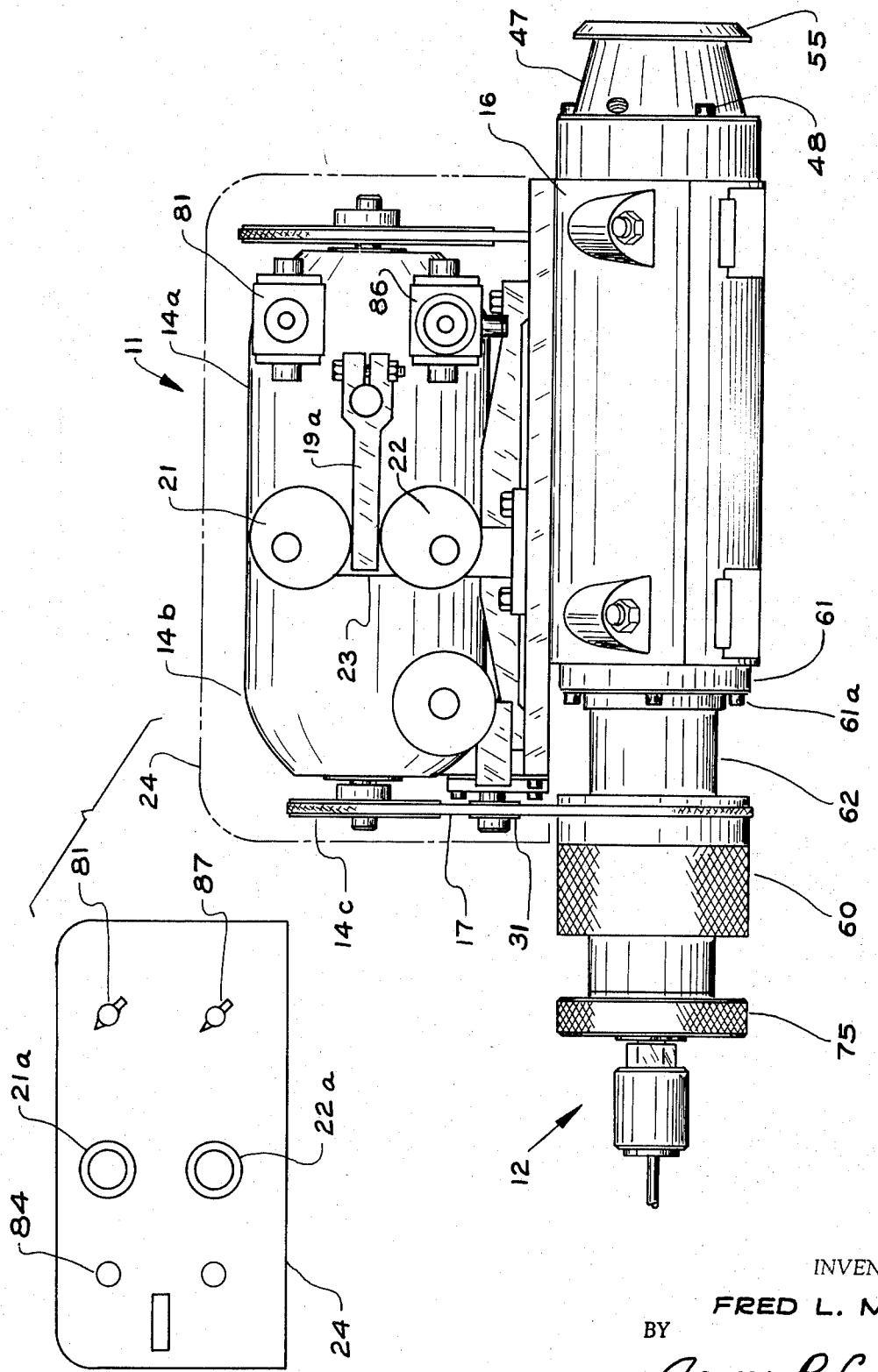
FIG. 1 is a front elevation of the machine embodying the concepts of applicant's invention having the front control panel terefore displaced from normal position for clarity.
Figures 2, 3:
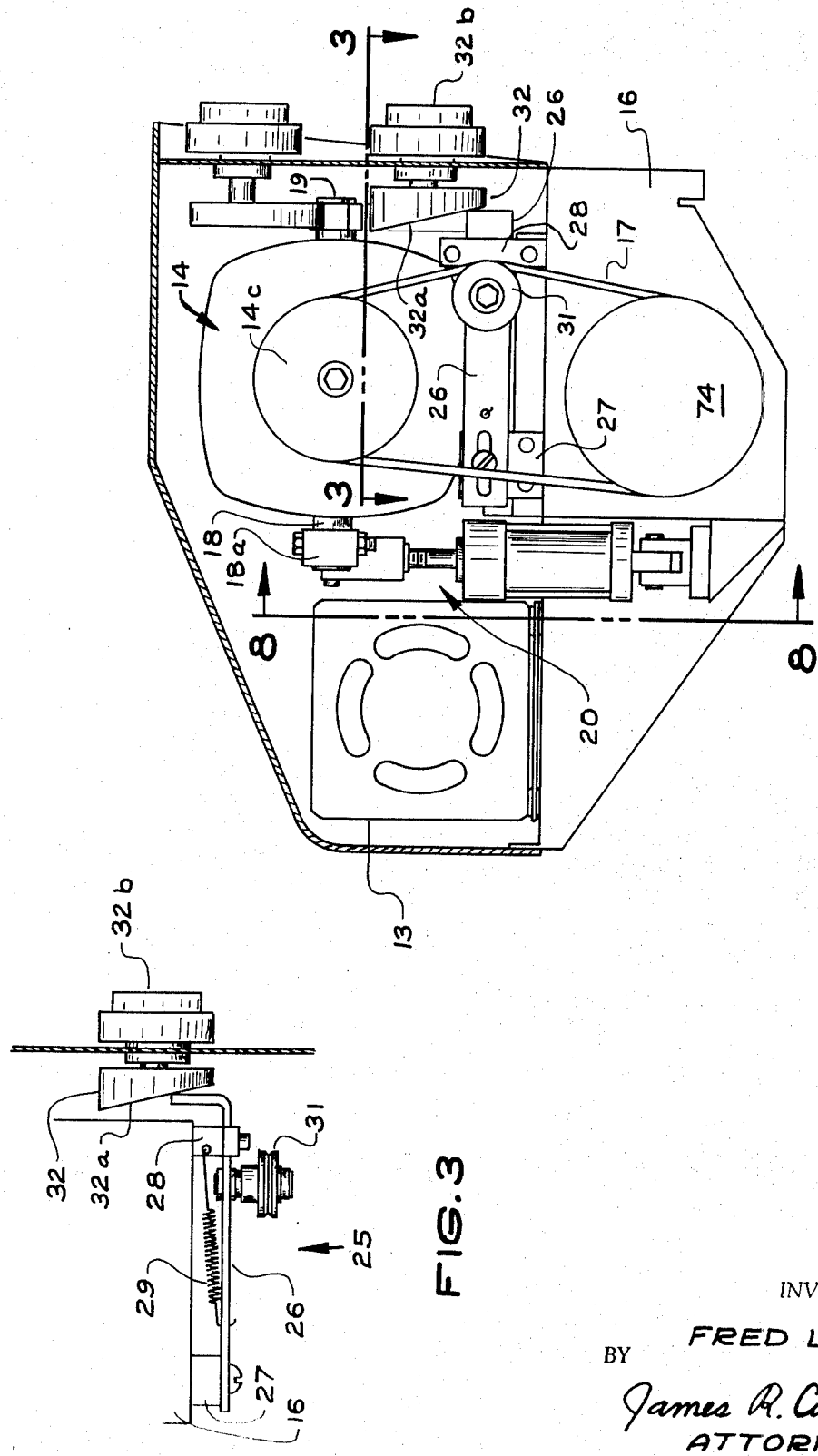
FIG. 2 is an elevation taken from the left side of the unit.
FIG. 3 is a horizontal section taken substantially along line 3—3 of FIG. 2.

In accordance with the accompanying drawings, applicant's machine tool may basically be divided into a power section 11 and a spindle section 12. The power section 11 in the form shown includes a first electrically powered motor 13 driving a combination hydraulic pump and motor designated 14 with the driving connection from the motor 13 to the pump unit 14 being through a connecting drive belt 15. These two units are mounted on the upper portion of the spindle housing 16.

Units similar to the combination hydraulic pump and motor 14 are commonly known in the art and basically consists of a pressure generating pump section 14a and a motor section 14b driven by the fluid delivered thereto by and from the pump section 14a. The output from the motor section 14b is delivered to the spindle section 12 through a drive pulley 14c and drive belt 17 combination. To control the speed of the hydraulic motor 14b internal valving is normally provided in the unit and the valve is controlled by external connections 18, 19. This valve also normally provides for forward and rearward flow to the motor section 14b such that rotation in both directions is available.

Control for the combination unit 14 is afforded through a first actuating air cylinder 20, particularly illustrated in FIG. 8, which cylinder controls the movement of the valve control shaft 18 through a lever member 18a. This cylinder is again mounted on the spindle base 16. This cylinder 20 is also a two way cylinder such that the control shaft 18 may be rotated into both the forward flow direction and the rearward flow direction. Shaft 18 extends through the body of the unit 14 to provide the control end 19. The speed of the motor is controlled by providing adjustable stop cams 21, 22 arranged in vertically adjustable relation with respect to a control lever 19a attached to the control connection 19. These control cams 21, 22 are mounted for rotation on a support member 23 and the control knobs therefore extend through the front panel for the unit, the panel being designated 24 and the respective control knobs 21a, 22a. The functions of the cams 21, 22 is to control the amount of movement of the valve controlling shaft and therefore control the flow of fluid from the pump 14a to the motor 14b. Assuming that a generally horizontal position of the lever 19a is a neutral position and upward movement controls forward directing flow and downward movement controls rearward directing flow. The distance of travel of the lever 19a controls the speed of the motor 14b and therefore it should be obvious that these cams 21, 22 will control all the combinations of forward, reverse rotation simply by locating the cams at a proper distance from the horizontal, neutral position such that the control shaft, when rotated by the action of the air cylinder 20 will be stopped by the cams.

To further control the spindle 12 rotation, an idler member 25 is mounted in relation to the belt 17. This idler device includes a first L-shaped cam follower 26 mounted for sliding movement through a pair of guides 27, 28 spaced on the spindle mounting unit 16 and a spring 29 is provided to normally urge the unit 25 against the belt 17 and also against a control cam 30 mounted for rotation on the front panel 24. The idler arrangement includes a belt contacting and controlling sheave 31 mounted for rotation on the L-shaped member 26 to take up the slack in the belt 17 and transfer the rotative power from the pulley 14c to the spindle assembly 12. The cam member 32 is a longitudinally formed cam with the front face 32a thereof being in camming contact with the short leg of the L-shaped follower 26. This cam 32 is mounted for rotation on the front panel and a control knob 32b is provided to control the cam face 32a and thereby control the position of the sheave 31 which obviously will tighten or loosen the drive belt 17 for rotation of the spindle.

The spindle drive mechanism as discussed takes a particular selected form but it should be obvious to anyone skilled in the art that other forms of driving mechanisms could be employed that would provide the same type of adjustable speed in both rotative directions without departing from the scope of the invention.

The spindle housing 16 in the form shown in designed for mounting on the ways of a grinding machine and for this mounting the shape as shown in the side elevations is important but it should be understood that the machine disclosed herein could be mounted as a work piece holder on many other machines and therefore the particular shape of the base and the means for anchoring the same to the primary machine are relatively to the application and do not form an important aspect of the invention. It should be further understood that this unit could in and by itself form the principal part of a unit and such a completely different form of base structure would be employed which would permit the attachment of other tools or the like thereto.

The spindle housing 16 does provide a longitudinal passage 35 therethrough with a pair of bearing members 36, 37 mounted respectively internally thereof at the ends thereof. Between the bearings 36, 37 an oil sump 38 with a breather device 38a is provided for proper lubrication of the spindle 40 therein.

The spindle assembly includes a rotatably mounted, longitudinally extending, generally cylindrical member 40 received into the passage 35 of the housing 16 to ride upon the bearings 36, 37. This member 40 provides a longitudinal passage 40a therethrough which passage 40a is tapered at the forward end thereof as at 40b which tapered surface 40b provides a closing area for a collet received therein and drawn thereagainst. The opposite internal end of the member 40 provides a bearing receiving area as at 40c for the mounting of a bearing and sealing member 41 therein with the seal member being designated 41a. This bearing provides a riding surface for a draw bar 46 which is received into the passage 40a through the member 40.

To properly locate the member 40 within the housing 16 a first radially extending shoulder is provided in spaced relation to the tapered end 40b thereof and this shoulder 42 is longitudinally held against a first arcuate bearing 43 by a second similar arcuate bearing 44 and a tapered bezel member 45 which bezel is in turn loaded in both a radial and a longitudinal direction by a plurality of spring loaded pin members 45a. In this manner then the entire member 40 and the elements carried thereby are loaded at only one end and any expansion of the member due to heat generation or the like will be directed rearward towards a free floating end which is free to accomodate such expansion. This mounting will prevent freeze up of the unit due to such expansions and further this type of mounting simplifies the normal tolerance requirements that would be necessary if the unit were contained at both ends.

The aforementioned spring loading members 45a are positioned in a nose piece 47 which is attached to the housing through a plurality of attachment members 48 with a seal member 49 disposed between the two mating surfaces thereof. The nose piece includes a spring loading sealing member 50 arranged in adjacent relation to the spring loading members 45a and this member is obviously placed to control any oil leakage from the interior of the housing. The nose piece 47 terminates adjacent the tapered end 40b of the member 40 and a second seal member 51 is arranged adjacent this end. Interiorally of the nose piece 47 and arranged at a normally lower end or side thereof is a sump 52 having an outlet 52a such that if any oil should bypass the seal 50 it will drain from the sump.

A protective ring member, termed a slinger ring 55 is removably mounted on the extending end of the member 40 and this particular ring is illustrated partially, at an enlarged scale in FIG. 6. A groove is provided in the member 40, designated 56 and the ring 55 includes a passage 57 therethrough with a matching groove 58, these two grooves providing a capturing area for an o-ring or the like which extends between the two grooves to lock the two elements together. An entrance portion of the passage 57 may be tapered as at 57a to facilitate assembly of the items. The slinger ring 55, in the form shown includes a radially extending portion 55a and a rearward diverging portion 55b. The purpose of the ring is to "throw" machined material from the work area and this will prevent this same material from entering either the bearing area for the member 40 and will also prevent this material from entering the collet area.

One other positioning concept to properly locate the member 40 is the inclusion of a pair of spaced spring loaded bearing elements, one within each of the aforementioned bearings 36, 37. This bearing structure is particularly illustrated in FIG. 7 wherein a passage 60 is formed parallel to the axis of the passage through the bearing and a bearing member 61 having a sloping front surface 62 is mounted therein with a spring loading arrangement consisting of a spring member 63 and a locking member 64 arranged therebehind to load the member 40. This internal loading technique again simplifies the normal high tolerance requirements between the bearings and member 40 when such a precision device is provided.

The driving mechanism to provide rotation for the member 40 is arranged on the end of the same opposite the nose piece and includes a drive and draw bar actuating assembly generally designated 60.

The end of housing 16 adjacent this assembly 60 is closed and sealed through a cap member 61 attached to housing 16 through cap screws 61a or the like which cap 60 includes a seal 61b for sealing against the side of the housing with a second seal 61c arranged to seal against the member 40. This cap member also houses a spring loaded oil seal member 61d which again seals against the exterior of the member 40.

The means for delivering rotative power to the member 40 includes a first sheave member 62 arranged about and secured to the exterior of the member 40 through a plurality of set screws 63 which are threadably received through the member 62 and are received into detents 63a in the member 40. Although the method of this connection, in the form shown, includes set screws, it should be obvious that many other methods may be utilized to positively connect these two members. This sheave member is provided with a reduced shoulder area 62a which is of a diameter to permit sealing against the exterior surface of the draw bar 46 through a sealing ring member 62b or the like. A longitudinally extending recess 62c is provided on the outer end of the sheave 62 to serve as an air flow passage.

A closure member 64 providing an internal cavity 65 is sealingly attached to the outer end of the sheave member 62 and this cavity extends longitudinally to provide a spring locating and retaining area 66. The spring arranged within the retaining area 66 includes a compression spring having retaining elements 68 on the ends thereof. The spring is designated 67 and is obviously of the coil variety to provide a passage therethrough to permit the draw bar 46 to pass therethrough.

The draw bar, in the form shown, includes a collet attachment end 46a designed to receive and properly hold collets inserted therein. This collet receiving end is located with respect to the tapered end 40b of the member 40 such that as the draw bar is actuated and moved rearwardly, the collet will be closed by contacting the tapered surface.

Means for actuating and shifting the draw bar 46 are located within the aforementioned internal cavity 65 which cavity actually forms a cylinder for movement of the actuating means. The actuating means includes a first piston member 70 secured to the exterior of the draw bar 46 with sealing and retaining rings 71, 72 on both sides thereof. The exterior of the piston 70 is movably sealed to the interior walls of the cavity 65 with suitable sealing means 73.

The means for introduction of actuating pressure to the piston is accomplished by providing an internal passage 74 longitudinally inward from the end of the draw bar 46 with communication passages 74a extending radially outwardly therefrom to permit air passage to the side of the piston 70 opposite the spring member 67.

In the form shown, an arcuate handle member 75 is provided on the draw bar 46 exteriorally of the closure member 64 and this member 75 is positively secured to the draw bar such that the same may be manually turned within the member 40.

Exteriorly of the handle member 75 a rotating air connection device 76 is provided. These devices are well known in the art and are utilized to pass air into rotating air chambers without transferring the rotation.

The actual operation and controls for the device are best understood by a comparison of the schematic control diagram of FIG. 9 and the front panel as illustrated in FIG. 1 wherein the various manual controls for the device are shown, some of which have been previously disclosed.

The schematic view illustrates an air inlet 80 delivering air under pressure to a first control valve 81 which is a two-position, three way valve member to control the aforementioned control cylinder 20 such that the same will be actuated to move the lever 18 either upwardly or downwardly for forward or reverse rotation of the spindle assembly. The air cylinder 20 is provided with a pair of inlet-outlet passages and each of these passages or conduits from the valve 81 is provided with a throttle valve 82, 83 which will throttle the flow of air passing therethrough from the cylinder 20 such that the speed with which the lever 18 is moved is controlled by the exhaust of the air from the outlet side of the piston. For example, in the valve position shown, valve 82 will allow the full flow of air into the cylinder 20 to force the piston therein downwardly but the controllable flow through valve 83 will control the speed at which the piston moves and thereby control the rate at which the lever is shifted to control the rate at which the motor reaches its desirable pre-set speed which is controlled by the aforementioned cam 22. Applicant has found that the valves 82, 83 may be either manually controlled or may be pre-set and for this reason the control knob 84 is arranged on the front panel 24 to permit controllable setting of the rate of speed increase on only the forward direction.

It should be noted that the actuating force for moving the collet draw bar is also connected in parallel to the cylinder controlling line and the flow therethrough, for example with the positions shown, is through a shuttle valve 84 and ultimately to the collet closing assembly which consists of the aforementioned draw bar controlling piston cavity 65 to urge the piston and thus the draw bar 46 into collet retracting position. It should be noted that a pair of such shuttle valves 84, 85 are provided and both are arranged to feed and control the collet controlling device. This pair of valves is necessary so that the collet will remain closed whenever the air cylinder 20 is actuated for either forward or reverse driving of the spindle assembly 12. The function of these shuttle valves is to normally supply the necessary piston moving and collet closing pressure whenever the spindle assembly is rotated and to likewise open the collet whenever this rotation is stopped.

It is often desirable to maintain the collet in its closed, work holding position when the rotation is stopped and for this reason a collet override valve 86 and associated control knob 87 are provided. It should be noted that this valve 86 receives air under pressure from the inlet source and when the same is shifted to its on position that full pressure air is delivered to the collet closing mechanism and this air pressure will override the pressure delivery from the valve 81, due to the particular shuttle valve construction to maintain the collet in its closed position until the same is returned to its off position.

In operation then the unit is energized and the normal operation will be to select a forward speed through positioning of the cam 21, loading the work piece in the collet and thereafter shifting the valve 81 (as seen in the schematic of FIG. 9) to the left. This shifting will introduce air under pressure to the collet closing device through shuttle valve 85 and will simultaneously introduce air into the air cylinder 20 which will control the flow of hydraulic fluid to the motor for rotation of the spindle assembly 12. If the machining of the part or other desired operation can be performed without an intermediate check of the part then it is simply necessary to shift the valve 81 to the right which will lower the control lever 18 to what may be termed a non-flow position and the roation of the spindle assembly 12 will stop and the collet closing device will open due to the spring pressure and the part will be released. If it is essential to check and continue machining of the work piece it may be essential to employ the collet override valve 86 and this valve will maintain collet closing pressure even though the rotational forces are stopped.

As previously stated the controlled start-up or rate of speed increase to the desirable speed level is a function of the rotation and is not a factor in the override situation.

The operation in a reverse direction is obviously accomplished through the same manipulation and further discussion os such operation is not deemed essential.

It should be obvious that the unit as described herein is designed to accomplish at least all of the aforementioned objectives of the invention and that the uniqueness of the unit is obvious to those skilled in the art.

What I claim is:

1. A machine tool including:
    a. a supporting base member;
    b. a spindle assembly rotatably mounted in said base member;
    c. a source of rotary power drivingly connected to said spindle assembly;
    d. said spindle assembly including a first shaft member mounted in said base member and having at least one end extend outwardly therefrom with a housing providing a cylinder, arranged on said end and a second draw bar member mounted within said shaft member for longitudinal movement therein, and having one end arranged to extend through said chamber and housing, said shaft member having a collet abutting and closing end and said draw bar member having means for attaching collets thereto for closing against said closing end when the same is longitudinally shifted;
    e. a piston defined by said draw bar arranged within said cylinder;
    f. an axial passage formed longitudinally in said draw bar from the extending end thereof with at least one communicating passage formed transversely to provide communication to one side of said piston whereby pressure may be applied thereto for shifting said piston and draw bar;
    g. a rotary pressure connector on the extending end of said draw bar;
    h. valve means controlling pressure to said connector and valve means;
    i. means for controlling the delivery of rotative power to said spindle assembly; and,
    j. said rotative power control means and said draw bar shifting means being interconnected to close said collet upon delivery of rotative power and opening said collet upon stopage of rotative power delivery.

2. The structure set forth in claim 1 and means for overriding said interconnection permitting the collet to remain closed after stoppage of rotative power delivery.

* * * * *